United States Patent

Sun et al.

[11] Patent Number: 5,963,959
[45] Date of Patent: Oct. 5, 1999

[54] FAST REFRESH OF SNAPSHOTS

[75] Inventors: Harry Sun, Redwood City; Alan Downing, Fremont; Benny Souder, Belmont, all of Calif.

[73] Assignee: Oracle Corporation, Redwood Shores, Calif.

[21] Appl. No.: 08/865,645

[22] Filed: May 30, 1997

[51] Int. Cl.$^6$ .................................................. G06F 17/30
[52] U.S. Cl. .................... 707/200; 707/201; 707/100; 707/102; 707/103; 707/104; 707/2
[58] Field of Search ..................... 707/201, 200, 707/104, 100, 102, 103, 2

[56] References Cited

U.S. PATENT DOCUMENTS

| | | | |
|---|---|---|---|
| 4,631,673 | 12/1986 | Haas et al. | 707/100 |
| 5,175,849 | 12/1992 | Schneider | 707/201 |
| 5,287,496 | 2/1994 | Chen et al. | 707/201 |
| 5,701,480 | 12/1997 | Raz | 395/671 |
| 5,806,074 | 9/1998 | Souder et al. | 707/201 |
| 5,806,075 | 9/1998 | Jain et al. | 707/201 |

*Primary Examiner*—Anton Fetting
*Assistant Examiner*—Jean M. Corrielus
*Attorney, Agent, or Firm*—McDermott, Will & Emery

[57] ABSTRACT

A method and apparatus employs primary key values stored in a master table to drive a fast refresh mechanism for a snapshot defined on the master table. A primary key is a set of columns in the master table having a combined value that uniquely identifies each row in the master table. When rows of the master table are modified, the primary key values of the modified rows are recorded in a master log. In response to a fresh command, differences between the master table and snapshot are reconciled based on primary key values stored in the master table, the master log, and the snapshot.

40 Claims, 11 Drawing Sheets

Figure 2(a)

| MASTER TABLE | | | -200 |
|---|---|---|---|
| CID* | ... | ZIP | |
| 1 | ... | 22041 | |
| 2 | ... | 22043 | |
| 3 | ... | 22043 | |
| 4 | ... | 22090 | |

| MASTER LOG | -210 |
|---|---|
| CID* | TIME$$ |

Figure 2(b)

| MASTER TABLE | | | -200 |
|---|---|---|---|
| CID* | ... | ZIP | |
| 1 | ... | 22041 | |
| 2 | ... | 22043 | |
| 3 | ... | 22043 | |
| 4 | ... | 22090 | |
| 5 | ... | 22046 | |

| MASTER LOG | -210 |
|---|---|
| CID* | TIME$$ |
| 5 | 4000 |

Figure 2(c)

| MASTER TABLE | | | -200 |
|---|---|---|---|
| CID* | ... | ZIP | |
| 1 | ... | 22041 | |
| 3 | ... | 22043 | |
| 4 | ... | 22090 | |
| 5 | ... | 22046 | |

| MASTER LOG | -210 |
|---|---|
| CID* | TIME$$ |
| 5 | 4000 |
| 2 | 4000 |

Figure 2(d)

| MASTER TABLE | | | -200 |
|---|---|---|---|
| CID* | ... | ZIP | |
| 1 | ... | 22041 | |
| 3 | ... | 22043 | |
| 4 | ... | 20190 | |
| 5 | ... | 22046 | |

| MASTER LOG | | -210 |
|---|---|---|
| CID* | TIME$$ | |
| 5 | 4000 | |
| 2 | 4000 | |
| 4 | 4000 | |

Figure 2(e)

| MASTER TABLE | | | -200 |
|---|---|---|---|
| CID* | ... | ZIP | |
| 3 | ... | 22043 | |
| 4 | ... | 20190 | |
| 5 | ... | 22046 | |
| 6 | ... | 22041 | |

| MASTER LOG | | -210 |
|---|---|---|
| CID* | TIME$$ | |
| 5 | 4000 | |
| 2 | 4000 | |
| 4 | 4000 | |
| 1 | 4000 | |
| 6 | 4000 | |

Figure 4(a)

| SNAPSHOT | | | 400 |
|---|---|---|---|
| CID* | ... | ZIP | |
| 1 | ... | 22041 | |
| 2 | ... | 22043 | |
| 3 | ... | 22043 | |
| 4 | ... | 22090 | |

| MASTER LOG | | 402 |
|---|---|---|
| CID* | TIME$$ | |
| 5 | 1 | |
| 2 | 1 | |
| 4 | 1 | |
| 1 | 1 | |
| 6 | 1 | |

| MASTER VIEW | | | 404 |
|---|---|---|---|
| CID* | ... | ZIP | |
| 3 | ... | 22043 | |
| 4 | ... | 20190 | |
| 5 | ... | 22046 | |
| 6 | ... | 22041 | |

Figure 4(b)

| SNAPSHOT | | | 400 |
|---|---|---|---|
| CID* | ... | ZIP | |
| 3 | ... | 22043 | |
| 4 | ... | 22090 | |

| MASTER LOG | | 402 |
|---|---|---|
| CID* | TIME$$ | |
| 5 | 1 | |
| 2 | 1 | |
| 4 | 1 | |
| 1 | 1 | |
| 6 | 1 | |

| MASTER VIEW | | | 404 |
|---|---|---|---|
| CID* | ... | ZIP | |
| 3 | ... | 22043 | |
| 4 | ... | 20190 | |
| 5 | ... | 22046 | |
| 6 | ... | 22041 | |

Figure 4(c)

| SNAPSHOT | | | 400 |
|---|---|---|---|
| CID* | ... | ZIP | |
| 3 | ... | 22043 | |
| 4 | ... | 22090 | |

| MASTER LOG | | 402 |
|---|---|---|
| CID* | TIME$$ | |
| 5 | 1 | |
| 2 | 1 | |
| 4 | 1 | |
| 1 | 1 | |
| 6 | 1 | |

| MASTER VIEW | | | 404 |
|---|---|---|---|
| CID* | ... | ZIP | |
| 3 | ... | 22043 | |
| 4 | ... | 20190 | |
| 5 | ... | 22046 | |
| 6 | ... | 22041 | |

Figure 4(d)

| SNAPSHOT | | |
|---|---|---|
| CID* | ... | ZIP |
| 3 | ... | 22043 |
| 4 | ... | 20190 |

400

| MASTER LOG | |
|---|---|
| CID* | TIME$$ |
| 5 | 1 |
| 2 | 1 |
| 4 | 1 |
| 1 | 1 |
| 6 | 1 |

402

| MASTER VIEW | | |
|---|---|---|
| CID* | ... | ZIP |
| 3 | ... | 22043 |
| 4 | ... | 20190 |
| 5 | ... | 22046 |
| 6 | ... | 22041 |

| SNAPSHOT | | |
|---|---|---|
| CID* | ... | ZIP |
| 3 | ... | 22043 |
| 4 | ... | 20190 |
| 5 | ... | 22046 |
| 6 | ... | 22041 |

400

| MASTER LOG | |
|---|---|
| CID* | TIME$$ |
| 5 | 1 |
| 2 | 1 |
| 4 | 1 |
| 1 | 1 |
| 6 | 1 |

402

| MASTER VIEW | | |
|---|---|---|
| CID* | ... | ZIP |
| 3 | ... | 22043 |
| 4 | ... | 20190 |
| 5 | ... | 22046 |
| 6 | ... | 22041 |

| MASTER LOG | 600 |
|---|---|
| CID* | TIME$$ |
| 5 | 1 |
| 2 | 1 |
| 4 | 2 |
| 1 | 4000 |
| 6 | 4000 |

Figure 6(b)

| MASTER LOG | 600 |
|---|---|
| CID* | TIME$$ |
| 5 | 1 |
| 2 | 1 |
| 4 | 2 |
| 1 | 3 |
| 6 | 3 |

Figure 6(c)

| MASTER LOG | 600 |
|---|---|
| CID* | TIME$$ |
| 5 | 1 |
| 2 | 1 |
| 4 | 2 |
| 1 | 3 |
| 6 | 3 |
| 7 | 4000 |

Figure 6(d)

| MASTER LOG | 600 |
|---|---|
| CID* | TIME$$ |
| 4 | 2 |
| 1 | 3 |
| 6 | 3 |
| 7 | 4000 |

Figure 7(a)

| UPDATEABLE SNAPSHOT | | | ⟋700 |
|---|---|---|---|
| CID* | ... | ZIP | |
| 1 | ... | 22041 | |
| 2 | ... | 22043 | |
| 3 | ... | 22043 | |
| 4 | ... | 22090 | |

| UPDATEABLE SNAPSHOT LOG | | | | ⟋710 |
|---|---|---|---|---|
| CID* | TIME$$ | OLD$$ | MOD$$ | |

Figure 7(b)

| UPDATEABLE SNAPSHOT | | | ⟋700 |
|---|---|---|---|
| CID* | ... | ZIP | |
| 1 | ... | 22041 | |
| 2 | ... | 22043 | |
| 3 | ... | 22043 | |
| 4 | ... | 22090 | |
| 5 | ... | 22046 | |

| UPDATEABLE SNAPSHOT LOG | | | | ⟋710 |
|---|---|---|---|---|
| CID* | TIME$$ | OLD$$ | MOD$$ | |
| 5 | 4000 | N | I | |

Figure 7(c)

| UPDATEABLE SNAPSHOT | | | ⟋700 |
|---|---|---|---|
| CID* | ... | ZIP | |
| 1 | ... | 22041 | |
| 3 | ... | 22043 | |
| 4 | ... | 22090 | |
| 5 | ... | 22046 | |

| UPDATEABLE SNAPSHOT LOG | | | | ⟋710 |
|---|---|---|---|---|
| CID* | TIME$$ | OLD$$ | MOD$$ | |
| 5 | 4000 | N | I | |
| 2 | 4000 | O | D | |

Figure 7(d)

| UPDATEABLE SNAPSHOT | | | ~700 |
|---|---|---|---|
| CID* | ... | ZIP | |
| 1 | ... | 22041 | |
| 3 | ... | 22043 | |
| 4 | ... | 20190 | |
| 5 | ... | 22046 | |

| UPDATEABLE SNAPSHOT LOG | | | | ~710 |
|---|---|---|---|---|
| CID* | TIME$$ | OLD$$ | MOD$$ | |
| 5 | 4000 | N | I | |
| 2 | 4000 | O | D | |
| 4 | 4000 | U | U | |

Figure 7(e)

| UPDATEABLE SNAPSHOT | | | ~700 |
|---|---|---|---|
| CID* | ... | ZIP | |
| 3 | ... | 22043 | |
| 4 | ... | 20190 | |
| 5 | ... | 22046 | |
| 6 | ... | 22041 | |

| UPDATEABLE SNAPSHOT LOG | | | | ~710 |
|---|---|---|---|---|
| CID* | TIME$$ | OLD$$ | MOD$$ | |
| 5 | 4000 | N | I | |
| 2 | 4000 | O | D | |
| 4 | 4000 | U | U | |
| 1 | 4000 | O | U | |
| 6 | 4000 | N | U | |

FAST REFRESH OF SNAPSHOTS

FIELD OF THE INVENTION

This invention relates to replication within database systems and more particularly to a method and system that allows for improved "fast refreshes" of snapshots.

BACKGROUND OF THE INVENTION

A snapshot is a body of data constructed of data from a "master" table. The master table may be local or remote relative to the snapshot. The data contained within a snapshot is defined by a query that references the master table and optionally other tables, views or snapshots. A snapshot can be refreshed on a periodic basis to reflect the current state of its corresponding base tables. An "updateable snapshot" is a snapshot to which updates may be directly made. Such updates are propagated from the snapshot back to the master table.

One method of refreshing snapshots is to reissue the defining query for the snapshot and simply replace the previous snapshot data with the results of the reissued query. This method is referred to as a "complete refresh." Complete refreshes are particularly disadvantageous when the master and snapshot tables are located at different sites in a network, because data for the entire refreshed snapshot table must be sent through the network.

Alternatively, another method known as a "fast refresh" can be performed to expedite the refresh operation. During a fast refresh, only those changes to the master table which have been made since the last refresh of the snapshot are transferred to the snapshot. A log file (referred to as a "master log") can be employed to track and record the rows that have been updated in the master table. A master log can be a buffer in main memory or a file stored on a persistent memory, such as a hard disk. When a snapshot is refreshed, only the appropriate rows in the master log need to be applied to the snapshot table. In a networked environment, only those rows updated or inserted at the master site since the previous refresh are transferred across the network and updated or inserted into the snapshot. Rows deleted in the master table are also deleted in the snapshot. Fast refresh is typically faster, more efficient, and involves less network traffic than a complete refresh.

A prior implementation of snapshots employs rowids to drive fast refreshes. A rowid is an address that reflects the physical location in which a corresponding row in a database table is stored. In prior fast refresh mechanisms, modified rows in the master tables and the updateable snapshots are recorded using rowids. During a fast refresh, distributed queries based upon the recorded rowids in the master log and the snapshot itself are used to reconcile differences between the snapshot and the master table.

There are several disadvantages with fast refresh methods driven by rowids. One disadvantage is that rowid-driven fast refresh methods present a problem in heterogeneous environments, since not all master sites employ rowids that are useable to the snapshot site. For example, the snapshot site may be maintained by a database system supplied by one vendor while the master site is maintained by a database system supplied by a different vendor. Since rowids are implementation-dependent, it is likely that the rowids of the master site are incompatible with the rowids of the snapshot site. Thus, fast refresh mechanisms based on rowids may not be possible with such incompatible databases.

Another disadvantage with using rowids to drive a fast refresh is that rowids typically do not persist through a reorganization of master tables. A table may be reorganized, for example, if the table becomes excessively fragmented from having numerous insert, update, or delete operations performed on that table. When a table is reorganized to defragment the table, row data in one disk block may be moved to another disk block to occupy storage that was previously used by rows that have been deleted. Since rowids represent the physical addresses of rows, after such reorganization, the rowids previously recorded for the snapshot are invalid, thereby precluding a fast refresh driven by rowids. Consequently, reorganizing a master table forces all snapshots to perform a complete refresh after the table reorganization. Another disadvantage to a rowid fast refresh method is that rowids have to be stored as part of the snapshot, consuming space for administrative overhead.

The problems described above are a barrier to large-scale deployment of snapshots and limit the usefulness of snapshots in heterogeneous environments. Thus, it is highly desirable to have a method and system for implementing snapshots and fast refreshes which can overcome such problems.

SUMMARY OF THE INVENTION

One aspect of the invention is a method of refreshing a snapshot defined by a snapshot definition query that references a master table. The master table has a primary key and is located at a master site. The method includes the step of detecting a modification to a row of the master table. In response to detecting the modification to the row of the master table, the primary key value stored in the row is recorded in a master log. In response to a refresh command, differences between the snapshot and the master table are reconciled based on primary key values stored in the master log, the master table, and the snapshot.

In another aspect, the method further comprises the step of detecting a modification to a row of the snapshot. In response to detecting the modification of the row of the snapshot, the modification is propagated to the master table and the primary key value string the row of the snapshot is recorded in a snapshot log with a modification indication. In response to the refresh command, differences between the snapshot and the master table are reconciled based on primary key values stored in the master log, the master table, the snapshot, and the snapshot log.

In another aspect, the method further comprises the step of recording a default value for a modification timestamp in the master log in response to detecting the modification of the row in the master table. In response to the refresh command, a refresh timestamp is generated and modification timestamps with the default value in the master log are reset to the refresh timestamp. Finally, rows are purged from the master log based on the refresh timestamp and the modification timestamp recorded in each row of the master log. In yet another aspect, administrative information about the snapshot is registered. The administrative information includes a reference to the refresh timestamp.

BRIEF DESCRIPTION OF THE DRAWINGS

The present invention is illustrated by way of example, and not by way of limitation, in the figures of the accompanying drawings and in which like reference numerals refer to similar elements and in which:

FIGS. 2(a)–2(e) depict a series of states of a master table and a corresponding master log when modifications are made to rows of the master table.

FIGS. 4(a)–4(e) depict a series of states of a snapshot, a master log, and a master view during a fast refresh operation.

FIGS. 6(a)–6(d) depict a series of states of a master log during a fast refresh operation of one of many snapshot for a master table.

FIGS. 7(a)–7(e) depict a series of states of an updateable snapshot and a corresponding updateable snapshot log according to an embodiment.

DESCRIPTION OF THE PREFERRED EMBODIMENT

A method and apparatus for refreshing a snapshot are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

HARDWARE OVERVIEW

Figure 1:
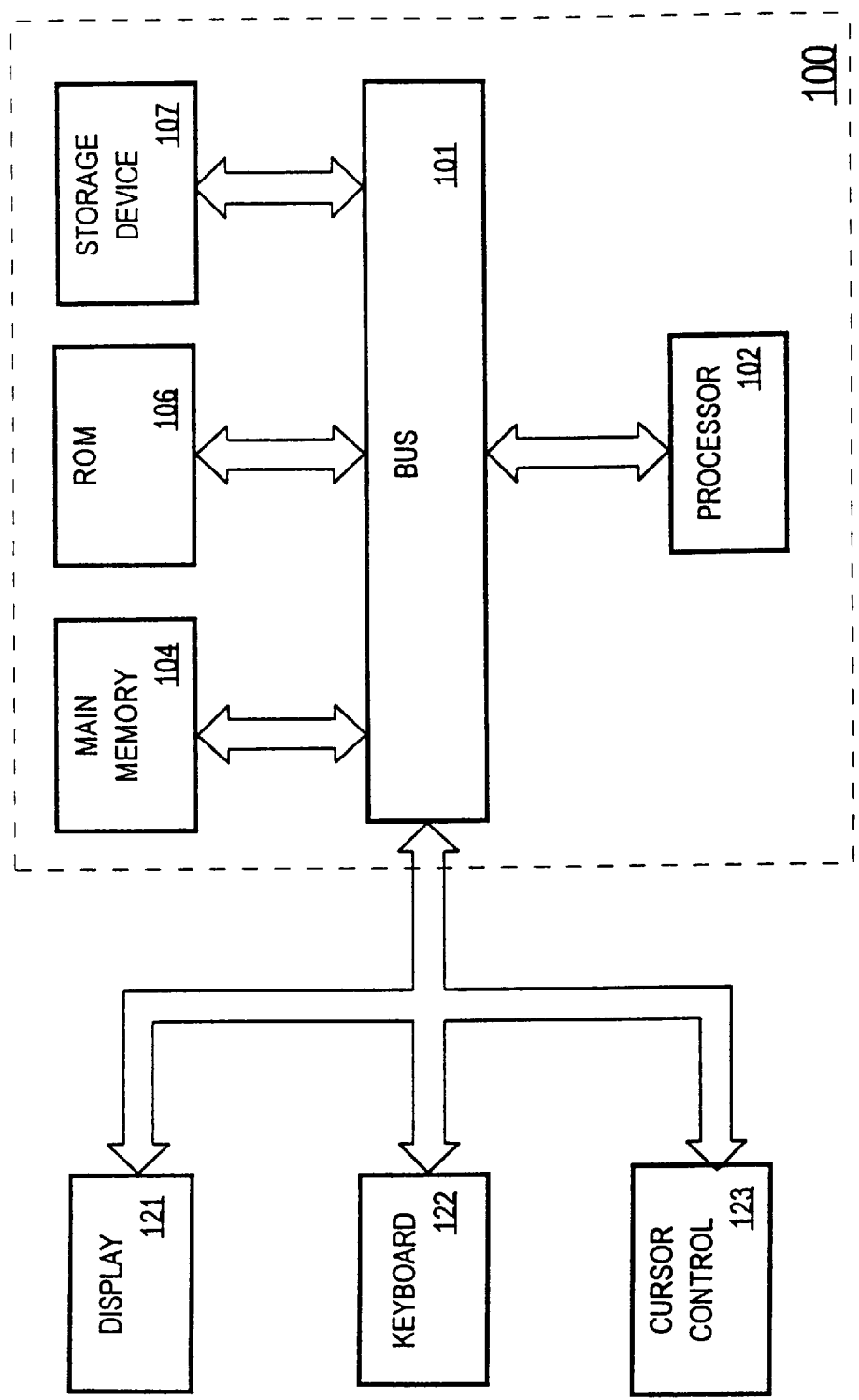
FIG. 1 is a high-level block diagram of a computer system upon which the present invention can be implemented.

Referring to FIG. 1, it is a block diagram of a computer system 100 upon which an embodiment of the present invention can be implemented. Computer system 100 includes a bus 101 or other communication mechanism for communicating information, and a processor 102 coupled with bus 101 for processing information. Computer system 100 further comprises a random access memory (RAM) or other dynamic storage device 104 (referred to as main memory), coupled to bus 101 for storing information and instructions to be executed by processor 102. Main memory 104 also may be used for storing temporary variables or other intermediate information during execution of instructions by processor 102. Computer system 100 also comprises a read only memory (ROM) and/or other static storage device 106 coupled to bus 101 for storing static information and instructions for processor 102. Data storage device 107 is coupled to bus 101 for storing information and instructions.

A data storage device 107 such as a magnetic disk or optical disk and its corresponding disk drive can be coupled to computer system 100. Computer system 100 can also be coupled via bus 101 to a display device 121, such as a cathode ray tube (CRT), for displaying information to a computer user. Computer system 100 further includes a keyboard 122 and a cursor control 123, such as a mouse.

The present invention is related to the use of computer system 100 to fast refresh a snapshot. According to one embodiment, fast refreshing a snapshot is performed by computer system 100 in response to processor 102 executing sequences of instructions contained in memory 104. Such instructions may be read into memory 104 from another computer-readable medium, such as data storage device 107. Execution of the sequences of instructions contained in memory 104 causes processor 102 to perform the process steps that will be described hereafter. In alternative embodiments, hard-wired circuitry may be used in place of or in combination with software instructions to implement the present invention. Thus, the present invention is not limited to any specific combination of hardware circuitry and software.

PRIMARY KEYS

In a relational database, a primary key is a set of columns in a table having a combined value that is unique and non-null within the table. Thus, a primary key value is able to uniquely identify each row in the table. Unlike rowids, primary key values are actually stored in each row and therefore are accessible from foreign databases and survive table reorganization. Since rows are uniquely identified by primary key values, the fast refresh mechanism according to an embodiment of the invention employs primary keys. Accordingly, the primary key values of modified rows of a master table are recorded in a master log.

There are variety of techniques known in the art, such as log sniffing and triggers, for detecting modifications of rows and recording information about the modification in a master log, but the present invention does require any particular technique. In a preferred embodiment, however, in-line triggers are used to detect modifications of master table rows. In-line triggers are described in more detail in U.S. patent application Ser. No. 08/866,823, entitled "In-line Triggers," filed on May 30, 1997 by Sandeep Jain, Mark Ramacher, and Lip B. Doo, the contents of which are incorporated by reference.

FIGS. 2(a)–2(e) illustrate a series of modifications a user might make to a master table and the corresponding entries recorded in a master log. Master table 200 of FIG. 2(a) is a table of customer information including a column for a primary key CID, a customer identifier, and a column ZIP for a customer's ZIP code. Each row represents a particular customer, who is assigned a non-null, unique identifier, CID. At this point, the corresponding master log 210 is empty.

Master table 200 of FIG. 2(b) is the result of adding a new customer with a CID of 5 and a ZIP of 22046 to master table 200 of FIG. 2(a). Consequently, the primary key value of the inserted row, 5, is recorded in master log 210. According to one embodiment, a default value for timestamp TIME$$ is also stored, as described hereafter in more detail.

Master table 200 of FIG. 2(c) is the result of deleting the customer identified by a CID of 2 from master table 200 of FIG. 2(b). Consequently, the primary key value of 2 is stored as a new entry in master log 210. If the zip code of customer with a CID of 4 in master table 204 is changed from 22090 to 20190, then master table 200 of FIG. 2(d) is the result. Accordingly, the primary key value, 4, of the updated row is stored as a new entry in master log 210.

In the prior rowid implementation, the rowid represents a physical address of a row. Thus, the rowid of a row does not change as the result of inserting, deleting, or updating a row; however, the rowid for a row may change if the table is reorganized. On the other hand, since primary key values are actually stored in each row, it is possible for the primary key value to be modified. Therefore, one embodiment of the invention treats the modification of a primary key value in a row as two operations, a deletion and an insertion. In the example, the user changes the CID in master table 200 of FIG. 2(d) from 1 to 6, resulting in master table 200 of FIG. 2(e). Accordingly, two separate entries are in master log 210. The first entry stores the old primary key value of 1, and the second entry stores the new primary key value of 6.

FAST REFRESH FROM MASTER LOG

An important feature that distinguishes snapshots from other kinds of materialized views is that snapshots are brought up-to-date with respect to a master table in response to an explicit refresh command. This explicit refresh command usually comes from a user, but may be periodically generated in the background by a computer system. Thus, snapshots are only made consistent with the master table at specific points in time. This feature of snapshots is particularly useful for laptop computers, which are only occasionally connected to a main database system housing the master table.

Figure 3:
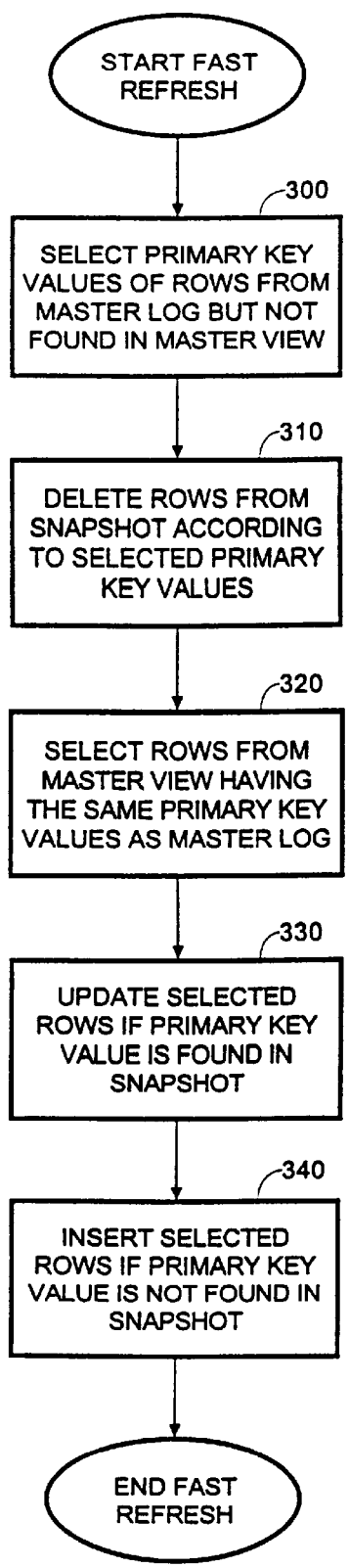
FIG. 3 is a flowchart illustrating the operation of fast refreshing a snapshot according to an embodiment.

FIG. 3 depicts a flowchart illustrating the operation of a fast refresh mechanism according to one embodiment of the invention. In step 300, primary key values are selected from the master log which are not found in a master view, the result of reissuing the snapshot definition query on the master table. In one embodiment, these primary key values are selected by issuing the following SQL query at the master site:

[STATEMENT 1]

select distinct mlog$.PK1, . . . , mlog$.PKn from mlog$
  where not exists (select 1 from mview$
    where (mview$.PK1 = mlog$.PK1 and . . . and
      mview$.PKn = mlog$.PKn)).

In this query, PK1 . . . PKn are the primary key columns; mlog$ stands for the master log; and mview$ stands for a view of the master table (hereinafter "master view"), which may be a materialized view, a macro or other unmaterialized view, or simply an embedded select statement.

For example, FIGS. 4(a)–4(e) illustrate a series of states belonging to snapshot 400, master log 402, and master view 404 during the fast refresh operation. Snapshot 400 is derived from master table 200 of FIG. 2(a) with the snapshot definition query that selects every row and column of master table 200. Master log 402 is the same as master log 210 of FIG. 2(e), the result of the series of modifications made as described above. Master view 404 indicates how the snapshot 400 should be after the fast refresh operation. After performing step 300 in this example, primary key values 2 and 1 are selected from master log 402 because there is no row in master view 404 having either of those primary key values.

The primary key values selected in step 300 are transmitted to the snapshot site and are used to delete from the snapshot those rows storing those primary key values (step 310). In one embodiment, these rows are deleted by issuing the following SQL statement:

[STATEMENT 2]

delete from snap$ where PK1=:1 and . . . and
  PKn=:n.

In this statement, snap$ stands for the snapshot and :1 through :n stand for each set of selected primary key values. In the example, snapshot 400 of FIG. 4(b) is the result of deleting from snapshot 400 of FIG. 4(a) two rows with a CID of 1 and 2.

After the deletions have been made to the snapshot, rows are selected from the master view that store primary key values also stored in the master log (step 320). In one embodiment, these primary key values are selected by issuing the following SQL query at the master site:

[STATEMENT 3]

select mview$.[snapshot columns] from mlog$, mview$
  where (mview$.PK1 = mlog$.PK1 and . . . and
    mview$.PKn = mlog$.PKn).

In the example, the rows, marked in bold in FIG. 4(c) with primary key values of 4, 5, and 6, of master log 402 and master view 404 are selected.

The selected rows are transmitted to the snapshot site, and rows in the snapshot are updated if they store a primary key value stored in one of the selected rows (step 330). In one embodiment, this step is performed by issuing the following SQL statement for each row (called MC):

[STATEMENT 4]

update snap$ set [columns to values for selected rows MC]
  where (snap$.PK1 = MC.PK1 and . . . and snap$.PKn = MC.PKn).

In the example, the result of updating a row of snapshot 400 of FIG. 4(c) is snapshot 400 of FIG. 4(d). In specific, the zip code column of the row with a CID of 4 is changed from 22090 to 20190.

If there is no row in the snapshot storing a primary key value for one of the selected rows, then that selected row is inserted into the snapshot (step 340). In one embodiment, determining whether a row of the snapshot is storing a primary key value from a selected row is performed by attempting the update SQL statement and checking the result. If the result is "0 rows processed," then the following SQL statement is executed for each selected row, MC:

[STATEMENT 5]

insert into snap$ ([snapshot columns])
  values ([values in MC]).

In the example, two new rows with CIDs of 5 and 6 are added, resulting in snapshot 400 of FIG. 4(e). The result of all these operations in the fast refresh is that snapshot 400 of FIG. 4(e) is consistent with master view 404. Both snapshot 400 and master view 404 have the same rows with the same values. In the example, the row having a CID of 3 was not transferred from the master site to the snapshot site, because no changes were made to it. Therefore, a fast refresh operation on a master table having many unchanged rows does not involve the transfer of these rows and is accordingly more efficient than a complete refresh, which transfers every row.

This example illustrates one possible series of states that would be performed in a single refresh operation; hence, only the final result, e.g., snapshot 400 in FIG. 4(e), is visible to users of the snapshot. Furthermore, the ordering of the state changes may vary.

In a preferred embodiment, the fast refresh queries are actually processed at the master site, to reduce the amount of data transferred between the master site and the snapshot site. The fast refresh queries are driven by the master log, which is usually much smaller than the master table. The master table itself is accessed by the primary key values recorded in the master log. On many database systems, it is more efficient to drive a query off the smaller table because fewer rows need be considered. Finally, by selecting all the rows to delete at once instead of one row at a time, information is transferred between the master site and the snapshot site in batches, reducing round trips through the network.

MULTIPLE SNAPSHOTS ON A MASTER TABLE

In order to prevent master logs from growing indefinitely, entries in the master log are purged after being used. In one embodiment, however, more than one snapshot may use the same master log, so it is important not to purge entries that other snapshots have not yet used. Accordingly, a refresh timestamp is maintained for each snapshot at the master site. This refresh timestamp for a snapshot indicates the time at which the snapshot executed a fast refresh. Furthermore, two phases, a "set-up" phase and a "wrap-up" phase are executed before and after the main fast refresh operation, respectively to perform maintenance of the master logs at the master site.

Figure 5:
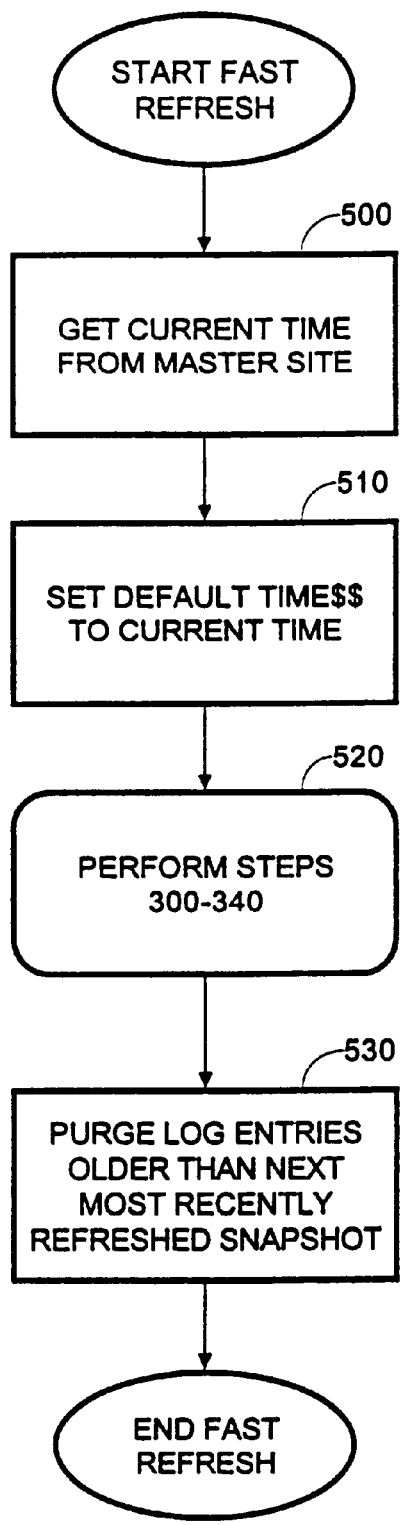
FIG. 5 is flowchart illustrating the operation of fast refreshing one of many snapshots for a master table according to an embodiment.

In response to a refresh command, the steps shown in FIG. 5 are performed and are illustrated with respect to the series of master logs shown in FIGS. 6(a)–6(d). Master log 600 of FIG. 6(a) is an example master log, recording entries for modifications to a master table. When new entries are made to a master log, the TIME$$ column is given a default value. In master log 600, two entries were recently added, and both have a default TIME$$ of 4000. The particular default TIME$$ may be NULL or preferably a time in the distant future. In step 500, the current refresh time is determined from the master site. In our example, this time is 3, much less than the default TIME$$ value of 4000.

In step 510, the "set-up" phase, the default TIME$$ values are set to the current refresh time. In the example, master log 600 of FIG. 6(b) is the result of changing the TIME$$ values of rows with a CID of 1 and 6 from 4000 to 3. Preferably, the set-up operation is performed in a separate transaction that does not require a two-phase commit. However, by avoiding two-phase commit, it is possible to that a new entry is added to the master log between step 510 and step 520. This possibility is illustrated with master log 600 of FIG. 6(c), which includes a new entry having a CID of 7 and a TIME$$ of 4000.

At step 520, the previously explained steps 300–308 are performed to execute the fast refresh request, with one proviso. In order to avoid processing the same snapshot rows twice, which affects performance but not correctness, only those entries in the master log dated later than the refresh timestamp for the snapshot are considered. This situation usually occurs when one snapshot is fast refreshed twice before another snapshot is fast refreshed. In one embodiment, the SQL predicate mlog$.TIME$$> snaptime, where snaptime is the refresh timestamp, is added to the where clauses of the fast refresh queries. By using a default TIME$$ set to a time in the distant future, the predicate still holds even if new entries to the master log were added. On the other hand, if the default TIME$$ value is NULL, then the predicate must include an extra check for NULL, e.g., or mlog$.TIME$$ is NULL.

After performing the main fast refresh transaction, the "wrap-up" phase begins in which master log entries that are older than the least recently refreshed snapshot are purged (step 530). In the example, assume that the current snapshot is now last refreshed at time 3 and that the other snapshot was last refreshed at time 2. Since the other snapshot is the least recently refreshed snapshot at time 2, rows having a TIME$$ less than 2 are purged, resulting in master log 600 of FIG. 6(d).

Upon successful completion of the operation, the refresh timestamp for the current snapshot is set to the current time value obtained in step 500.

SNAPSHOT REGISTRATION

In prior implementations, master sites did not maintain detailed administrative information about remote snapshots. Although this lack of information has made snapshot administration difficult, this problem becomes even more acute in heterogeneous environments as more and different tables are networked. For example, if a master table is dropped, altered, or moved to another site, all the snapshot sites for that master table must be notified.

Accordingly, one aspect of the invention provides for the registration of snapshots. When a snapshot is registered, information about the owner, name, and location of the snapshot is saved at the master site. Furthermore, a reference to refresh timestamp, such as a unique snapshot identifier, is stored with the registration information, so a database administrator can determine when a snapshot was last refreshed with a join operation. In one embodiment, snapshot registration is performed synchronously; however, persons of skill in the art recognize that snapshot registration may also be accomplished asynchronously through a remote procedure call (RPC) to the master site.

UPDATEABLE SNAPSHOTS

Another aspect of the invention is related to updateable snapshots. An updateable snapshot is a snapshot to which a user at the snapshot site is allowed to make changes. Changes to the snapshot are detected, preferably by an in-line trigger, asynchronously or synchronously propagated to the master site, and logged in an updateable snapshot log. In order to use primary key values instead of rowids for fast refreshing updateable snapshots, the information in the log must additionally record deletions to the updateable snapshot and distinguish when a primary key is updated.

LOGGING INFORMATION FOR UPDATEABLE SNAPSHOTS

FIGS. 7(a)–7(e) illustrate a series of modifications made to a master table and the corresponding entries recorded in a master log. Updateable snapshot 700 of FIG. 7(a) is a snapshot of customer information including a column for a primary key CID, a customer identifier, and a column ZIP for a customer's ZIP code. Each row represents a particular customer, who is assigned a non-null, unique identifier, CID. At this point, the corresponding updateable snapshot log 710 is empty.

Updateable snapshot log 710 comprises at least four columns. Updateable snapshot log 710, like master log 210, has one or more columns for the primary key, in this example, a CID column and a column for a refresh timestamp, TIME$$ as described above. In addition, updateable snapshot log 710 has a column MOD$$ which indicates the kind of modification performed. In one embodiment, MOD$$ has three values: 'I' for insert, 'D' for delete, and 'U' for update. Furthermore, updateable snapshot log 710 has an old/new column, OLD$$, which indicates whether a primary key value for the row is old ('O'), new ('N'), or unchanged ('U'). In one embodiment, the MOD$$ and OLD$$ columns are also present in the master logs.

Updateable snapshot 700 of FIG. 7(b) is the result of adding a new customer with a CID of 5 and a ZIP of 22046 to updateable snapshot 700 of FIG. 7(a). Consequently, the primary key value of the inserted row, 5, is recorded in updateable snapshot log 710. Since the modification is an insertion, an 'I' is recorded in the MOD$$ column. The updateable snapshot log trigger stores an 'N' in the OLD$$ column, because insertions necessarily create a new primary key value.

Updateable snapshot 700 of FIG. 7(c) is the result of deleting the customer identified with the CID of 2 from updateable snapshot 700 of FIG. 7(b). Consequently, the primary key value of 2 is stored as a new entry in updateable snapshot log 710. Since the modification is a deletion, necessarily indicating an old primary key value, a 'D' is stored in the MOD$$ column and an 'O' is stored in the OLD$$ column.

If the zip code of customer with a CID of 4 in updateable snapshot 704 is changed from 22090 to 20190, then updateable snapshot 700 of FIG. 7(d) is the result. Accordingly, the primary key value, 4, of the updated row is stored as a new entry in updateable snapshot log 710. In this example, the modification is an update of a non-primary key column; thus, a 'U' is stored in the MOD$$ column and a 'U' is stored in the OLD$$ column.

Unlike the prior rowid implementation, where the rowid represents a physical address of a row and does not change as the result of inserting, deleting, or updating a row, primary key values can be modified. In the example, a user may change the CID of a customer in updateable snapshot 700 of FIG. 7(d) from 1 to 6, resulting in updateable snapshot 700 of FIG. 7(e). Accordingly, a modification to a primary key column is indicated by two entries in the updateable snapshot log. In the first entry, the old primary key value of 1 is stored in updateable snapshot log 710 along with a 'U' for the MOD$$ column and an 'O' for the OLD$$ column. In the second entry, the new primary key value of 6 is stored in updateable snapshot log 710 along with a 'U' for the MOD$$ column and an 'N' for the OLD$$ column.

FAST REFRESH OF UPDATEABLE SNAPSHOTS

With updateable snapshots, changes made at the master site to the master table are recorded in a master log. Changes made at the snapshot site and propagated to the master table at the master site are recorded in an updateable snapshot log. Since both the master log and the updateable snapshot include information about changes to the master table, the fast refresh mechanism for updateable snapshots must consider entries in both the master log and the updateable snapshot log.

Figure 8:
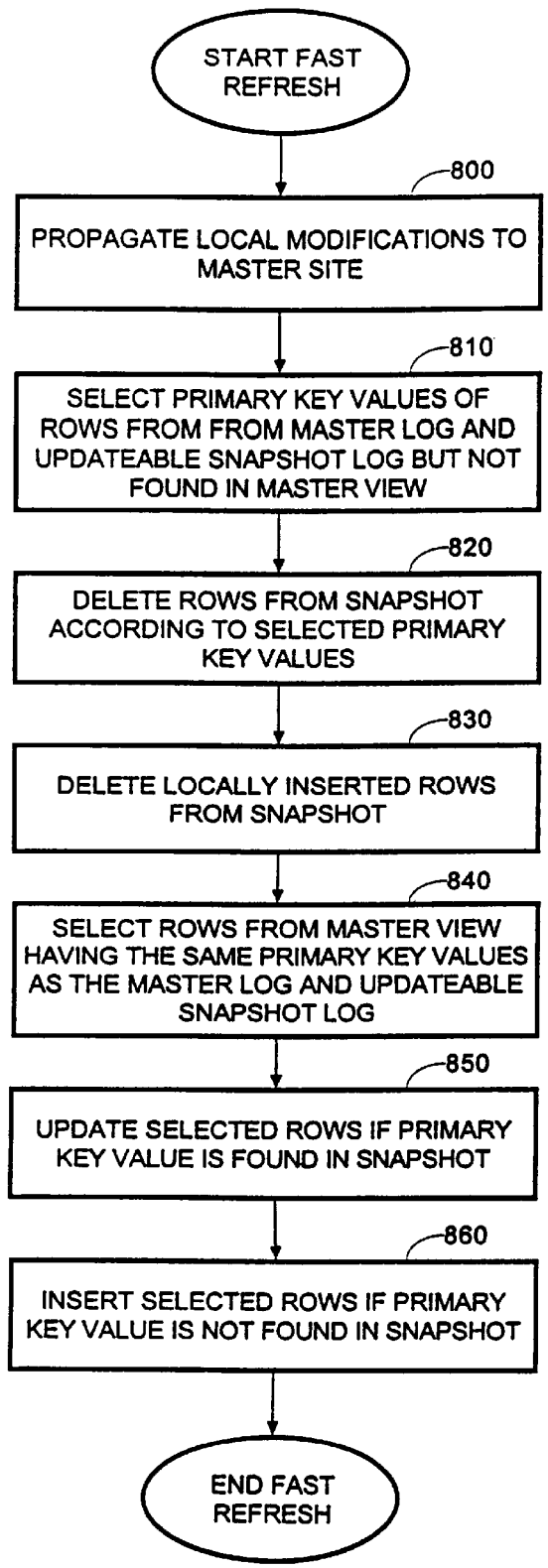
FIG. 8 is a flowchart illustrating the operation of fast refreshing an updateable snapshot according to an embodiment.

FIG. 8 depicts a flowchart illustrating the operation of fast refreshing an updateable snapshot according to an embodiment of the invention. In step 800, all unpropagated local modifications to the updateable snapshot are propagated back to the master site. In step 810, primary key values are selected from the master log, which are not stored in the master view. Primary key values are selected from deleted or updated entries of the updateable snapshot log that are not stored in the master view. For example, these primary key values are selected by issuing the following SQL query:

[STATEMENT 6]

```
select distinct log.PK1, . . . , log.PKn
from (select PK1, . . . , PKn from mlog$
    where (TIME$$ > snaptime)
union select PK1, . . . , PKn from uslog$
```

```
    where MOD$$ != 'I') log
where not exists (select 1 from mview$
    where (mview$.PK1 = log.PK1 and . . . and mview$.PKn =
    log.PKn)).
```

In this query PK1 . . . PKn represent the primary key columns; mlog$ is the name of the master log; uslog$ is the name of the updateable snapshot log; log is a variable which is the result of taking a union of the queries on mlog$ and uslog$; TIME$$ and MOD$$ are columns in the master log and the updateable snapshot log, respectively; snaptime stand for the time of the last refresh; and mview$ stands for the master view, which can be a materialized view, macro, or simply an embedded select statement based on the snapshot definition query.

The primary key values selected in step 810 are transmitted to the snapshot site and are used to delete the rows storing those primary key values from the snapshot (step 820). In one embodiment, these rows are deleted by issuing STATEMENT 2 as explained above. In addition, step 830 deletes rows from the snapshot which were locally inserted into the updateable snapshot. In an embodiment, the locally inserted rows are deleted with the following SQL statement:

[STATEMENT 7]

```
delete from snap$
    where [primary key] in [primary key values from STATEMENT 6]
```

After all the deletions have been made to the snapshot, rows are selected from the master view storing the same primary key value stored in the master log and in non-inserted rows of the updateable snapshot log (step 840). In one embodiment, this step is performed by issuing the following query:

[STATEMENT 8]

```
select mview$.*
    from (select PK1, . . . , PKn from mlog$
        where (TIME$$ > snaptime))
    union
        select PK1, . . . , PKn from uslog$
        where MOD$$ != 'I') log, mview$
    where (mview$.PK1 = log.PK1 = and mview$.PKn = log.PKn)
```

The selected rows are transmitted to the snapshot site for updating (step 850) or insertion (step 860), in a manner substantially similar to the mechanism described above for steps 330 and 340.

DUAL IMPLEMENTATIONS

In heterogeneous environments, it is desirable to support both rowid fast refresh and primary key fast refresh. For example, a customer may prefer the performance of rowid fast refresh for his native database tables but would like the flexibility accorded by primary key fast refreshes for foreign database tables, employing an incompatible format for rowids. embodiments are described.

Accordingly, the database system allows a user to designate whether a master table handles rowid snapshots, primary key snapshots, or both. If the master table is designated for rowid snapshots, then the prior rowid fast refresh mechanism is employed, in which rowids are recorded in the master log and are used to drive the fast refresh mechanism. If the master table is designated for primary key snapshots, then a primary key fast refresh mechanism according to an embodiment of the present invention is employed.

If, however, the master table is designated for both types of fast refresh mechanisms, then the master log trigger records entries in the master log containing both the rowids and the primary key values. Thus, if the snapshot is a rowid snapshot, then it is fast refreshed according to the prior fast refresh mechanism. On the other hand, if the snapshot is a primary key snapshot, it is fast refreshed according to one of the embodiments described above.

In the foregoing specification, the invention has been described with reference to specific embodiments thereof. It will be evident, however, that various modifications and changes may be made thereto without departing from the broader spirit and scope of the invention. The specification and drawings are, accordingly, to be regarded in an illustrative rather than a restrictive sense.

What is claimed is:

1. A method of refreshing a snapshot, defined by a snapshot definition query that references a master table having a primary key, said master table located at a master site, said method comprising the computer-implemented steps of:

detecting a modification of a row of said master table;

in response to detecting said modification of said row of said master table, recording the primary key value stored in said row of said master table in a master log; and in response to initiation of a refresh operation, reconciling differences between said snapshot and said master table based on primary key values stored in said master log, in said master table, and in said snapshot.

2. The method of claim 1, further comprising the step of validating that each row of said master table stores a primary key value and that each said primary key value is unique within said master table.

3. The method of claim 1, wherein the step of detecting a modification of a row of said master table includes the step of detecting an insertion of said row into said master table.

4. The method of claim 1, wherein the step of detecting a modification of a row of said master table includes the step of detecting a deletion of said row from said master table.

5. The method of claim 1, wherein:

the step of detecting a modification of a row of said master table includes the step of detecting an update of said row having an old primary key value before the update and a new primary key value after the update in said master table; and the step of recording the primary key value stored in said row of said master table in a master log includes the steps of:

recording the old primary key value in said master log and if the new primary key value is not equal to the old primary key value, then recording the new primary key value in said master log.

6. The method of claim 1, wherein the step of reconciling differences between said snapshot and said master table based on primary key values stored in said master log, master table, and said snapshot includes the steps of:

creating a master view at said master site defined by said snapshot definition query on said master table;

removing a first refresh row from said snapshot based on primary key values stored in said master view, said master log, and said snapshot;

updating a second refresh row of said snapshot based on primary key values stored in said master view, said master log, and said snapshot; and inserting a third refresh row into said snapshot based on primary key values stored in said master view, said master log, and said snapshot.

7. The method of claim 6, wherein the step of removing a first refresh row from said snapshot based on primary key values stored in said master view, said master log, and said snapshot includes the steps of:

getting a primary key value from said master log, wherein said primary key value is not stored in any row of said master view and said first refresh row of said snapshot has said primary key value; and deleting said first refresh row from said snapshot.

8. The method of claim 6, wherein the step of updating a second row of said snapshot based on primary key values stored in said master view, said master log, and said snapshot includes the steps of:

getting a primary key value from said master log, wherein said primary key value is stored in a current row of said master view;

searching for said second refresh row of said snapshot having said primary key value;

if said second refresh row is found, then updating said second refresh row of said snapshot with values of said current row of said master view.

9. The method of claim 8, wherein the step of inserting a third refresh row into said snapshot based on primary key values stored in said master view, said master log, and said snapshot includes the step of if said second refresh row is not found, then inserting said current row of master view as said third refresh row into said snapshot.

10. The method of claim 6, wherein the step of inserting a third refresh row into said snapshot based on primary key values stored in said master view, said master log, and said snapshot includes the steps of:

getting a primary key value from said master log, wherein said primary key value is stored in a current row of said master view;

searching for a refresh row of said snapshot having said primary key value; and if said refresh row is not found, then inserting said current row of master view as said third refresh row into said snapshot.

11. The method of claim 1, further comprising the steps of:

detecting a modification of a row of said snapshot;

in response to detecting said modification of a row of said snapshot, performing the steps of:

propagating said modification to said master table and recording the primary key value stored in said row of said snapshot in a snapshot log with a modification indication; and wherein the step of reconciling differences between said snapshot and said master table based on primary key values stored in said master log, master table, and said snapshot includes the step of reconciling differences between said snapshot and said master table based on primary key values stored in said master log, master table, said snapshot, and said snapshot log.

12. The method of claim 11, wherein:

the step of detecting a modification of a row of said snapshot includes the step of detecting an insertion of said row into said snapshot and the step of recording the primary key value stored in said row of said snapshot in a snapshot log with a modification indication includes the step of recording the primary key value stored in said row of snapshot in said snapshot log with an insertion indication.

13. The method of claim 11, wherein:

the step of detecting a modification of a row of said snapshot includes the step of detecting a deletion of said row from said snapshot and the step of recording the primary key value stored in said row of said snapshot in a snapshot log with a modification indication includes the step of recording the primary key value stored in said row of snapshot in said snapshot log with a deletion indication.

14. The method of claim 11, wherein:

the step of detecting a modification of a row of said snapshot includes the step of detecting an update of said row having an old primary key value before the update and a new primary key value after the update in said snapshot; and the step of recording the primary key value stored in said row of said snapshot in a snapshot log with a modification indication includes the steps of:

recording said new primary key value in said snapshot log with an update indication; and if said new primary key value is not equal to said old primary key value, then recording said old primary key value in said snapshot log with an update indication.

15. The method of claim 11, wherein:

the step of detecting a modification of a row of said snapshot includes the steps of:

detecting an insertion of a first modified row into said snapshot;

detecting a deletion of a second modified row from said snapshot; and detecting an update of a third modified row having an old primary key value before the update and a new primary key value after the update in said snapshot; and the step of recording the primary key value stored in said row of said snapshot in a snapshot log with a modification indication includes the steps of:

recording the primary key value stored in said first modified row of snapshot in said snapshot log with an insertion indication;

recording the primary key value stored in said second modified row of snapshot in said snapshot log with a deletion indication recording said new primary key value in said snapshot log with an update indication; and if the new primary key value is not equal to the old primary key value, then recording the old primary key value in said snapshot log with said update indication.

16. The method of claim 15, wherein the step of reconciling differences between said snapshot and said master table based on primary key values stored in said master log, master table, said snapshot, and said snapshot log includes the steps of:

creating a master view defined by said snapshot definition query on said master table;

removing a first refresh row from said snapshot based on primary key values stored in said master view, said master log, said snapshot log, and said snapshot;

updating a second refresh row of said snapshot based on primary key values stored in said master view, said master log, said snapshot log, and said snapshot; and inserting a third refresh row into said snapshot based on primary key values stored in said master view, said master log, said snapshot log, and said snapshot.

17. The method of claim 16, wherein the step of removing a first refresh row from said snapshot based on primary key values stored in said master view, said master log, said snapshot log, and said snapshot includes the steps of:

getting a first primary key value from said snapshot log, wherein said first primary key value is not stored in any row of said master view; and deleting said first refresh row having said second primary key value from said snapshot;

getting a second primary key value from said master log, wherein said second primary key value is not stored in any row of said master view;

deleting a second row having said second primary key value from said snapshot;

getting a third primary key value from said snapshot log, wherein said third primary key value is stored with said insertion indication; and deleting a third row having said third primary key value from said snapshot.

18. The method of claim 16, wherein the step of updating a second refresh row of said snapshot based on primary key values stored in said master view, said master log, said snapshot log, and said snapshot includes the steps of:

getting a first primary key value from said master log, wherein said first primary key value is stored in a first current row of said master view;

searching for a first row of said snapshot having said first primary key value; and if said first row of said snapshot is found, then updating said first row of said snapshot with said first current row of said master view;

getting a second primary key value from said snapshot log, wherein said second primary key value is stored in a second current row of said master view;

searching for said second row of said snapshot, wherein said second row of said snapshot has stored therein said second primary key value; and if said second row of said snapshot is found, then updating said second row of said snapshot with said second current row of said master view.

19. The method of claim 18, wherein the step of inserting a third refresh row into said snapshot based on primary key values stored in said master view, said master log, said snapshot log, and said snapshot includes the steps of:

if said second row of said snapshot is not found, then inserting said second current row of said master view as said third refresh row into said snapshot; and if said first row of said snapshot is not found, then inserting said first current row of said master view as a fourth refresh row into said snapshot.

20. The method of claim 16, wherein the step of inserting a third refresh row into said snapshot based on primary key values stored in said master view, said master log, said snapshot log, and said snapshot includes the steps of:

getting a first primary key value from said master log, wherein said first primary key value is stored in a first current row of said master view;

searching for a first row of said snapshot having said first primary key value; and if said first row of said snapshot is not found, then inserting said first current row of said master view as a fourth refresh row into said snapshot;

getting a second primary key value from said snapshot log, wherein said second primary key value is stored in a second current row of said master view;

searching for said second row of said snapshot, wherein said second row of said snapshot has stored therein said second primary key value; and if said second row of said snapshot is not found, then inserting said second current row of said master view as said third refresh row into said snapshot.

21. The method of claim 1, further comprising the steps of:

in response to detecting said modification of said row of said master table, recording a default value for a modification timestamp in said master log; and in response to initiation of said refresh operation, performing the steps of:

generating a refresh timestamp, indicating when said refresh operation was initiated;

resetting modification timestamps of said default value stored in said master log to said refresh timestamp;

purging rows from said master log based on said refresh timestamp, and the modification timestamp recorded in each of said rows.

22. The method of claim 21, further comprising the steps of:

registering administrative information about said snapshot; and recording a reference to said refresh timestamp with said administrative information.

23. The method of claim 1, further comprising the step of recording the rowid of said row of said master table in said master log in response to detecting said modification of said row of said master table.

24. The method of claim 23, wherein the step of reconciling differences between said snapshot and said master table based on primary key values stored in said master log, master table, and said snapshot includes the step of reconciling differences between said snapshot and said master table based on primary key values and rowids stored in said master log and said snapshot and based on primary key values stored in and rowids of said master table.

25. The method of claim 23, further comprising the step of in response to initiation of a second refresh operation, reconciling differences between a second snapshot and said master table based on rowids stored in said master log and said second snapshot and based on rowids of said master table.

26. The method of claim 1, further comprising the step of refreshing a second snapshot, defined by a second snapshot definition query that references a second master table that is located at said master site, wherein the step of refreshing said second snapshot includes the steps of:

detecting a second modification of a second row of said second master table;

in response to detecting said second modification of said second row of said second master table, recording the rowid of said second row of said second master table in a second master log; and in response to initiation of a second refresh operation, reconciling differences between said second snapshot and said second master table, based on rowids recorded in said second master log and said second snapshot and based on the rowids of said second master table.

27. A computer readable medium having stored thereon sequences of instructions for refreshing a snapshot, residing at a snapshot site, defined by a snapshot definition query that references a master table, residing a master site and having a primary key, said sequences of instructions includes sequences of instructions for performing the steps of:

detecting a modification of a row of said master table;

in response to detecting said modification of said row of said master table, recording the primary key value stored in said row of said master table in a master log; and in response to initiation of a refresh operation, transmitting the primary key value of a refresh row to said snapshot site based on primary key values stored in said master log and in said master table.

28. The computer readable medium of claim 27, further comprising sequences of instructions for performing the step of validating that each row of said master table stores a primary key value and that each said primary key value is unique within said master table.

29. The computer readable medium of claim 27, wherein the step of detecting a modification of a row of said master table includes the step of detecting an insertion of said row into said master table.

30. The computer readable medium of claim 27, wherein the step of detecting a modification of a row of said master table includes the step of detecting a deletion of said row from said master table.

31. The computer readable medium of claim 27, wherein:

the step of detecting a modification of a row of said master table includes the step of detecting an update of said row having an old primary key value before the update and a new primary key value after the update in said master table; and the step of recording the primary key value stored in said row of said master table in a master log includes the steps of:

recording the old primary key value in said master log and if the new primary key value is not equal to the old primary key value, then recording the new primary key value in said master log.

32. The computer readable medium of claim 27, wherein the step of transmitting the primary key value of a refresh row to said snapshot site based on primary key values stored in said master log and in said master table includes the steps of:

creating a master view defined by said snapshot definition query on said master table;

determining the primary key value stored in a refresh row from said snapshot based on primary key values stored in said master view and said master log; and transmitting said primary key value to said snapshot site whereby causing said refresh row to be updated.

33. The computer readable medium of claim 32, wherein the step of determining the primary key value stored in a refresh row from said snapshot based on primary key values stored in said master view and said master log includes the step of getting a primary key value from said master log, wherein said primary key value is not stored in any row of said master view.

34. The computer readable medium of claim 32, wherein the step of determining the primary key value stored in a refresh row from said snapshot based on primary key values stored in said master view and said master log includes the step of getting a primary key value from said master log, wherein said primary key value is stored in a current row of said master view.

35. The computer readable medium of claim 27, further comprising sequences of instructions for performing the steps of:

in response to detecting said modification of said row of said master table, recording a default value for a modification timestamp in said master log; and in response to initiation of said refresh operation, performing the steps of:

generating a refresh timestamp, indicating when said refresh operation was initiated;

resetting modification timestamps of said default value stored in said master log to said refresh timestamp;

purging rows from said master log based on said refresh timestamp, and the modification timestamp recorded in each of said rows.

36. The computer readable medium of claim 35, further comprising sequences of instructions for performing the steps of:

registering administrative information about said snapshot; and recording a reference to said refresh timestamp with said administrative information.

37. The computer readable medium of claim 27, further comprising sequences of instructions for performing the step of recording the rowid of said row of said master table in said master log.

38. The computer readable medium of claim 37, wherein the step transmitting the primary key value of a refresh row to said snapshot site based on primary key values stored in said master log and in said master table includes the step of transmitting the primary key value of said refresh row to said snapshot site based on primary key values and rowids stored in said master log and said snapshot and based on primary key values stored in and rowids of said master table.

39. The computer readable medium of claim 37, further comprising sequences of instructions for performing the step of transmitting the rowid of a second refresh row to a second snapshot site based on primary key values and rowids stored in said master log and a second snapshot and based on primary key values stored in and rowids of said master table.

40. The computer readable medium of claim 27, further comprising sequences of instructions for performing the step of refreshing a second snapshot, defined by a second snapshot definition query that references a second master table that is located at said master site, wherein the step of refreshing said second snapshot includes the steps of:

detecting a second modification of a second row of said second master table;

in response to detecting said second modification of said second row of said second master table, recording the rowid of said second row of said second master table in a second master log; and in response to initiation of a second refresh operation, reconciling differences between said second snapshot and said second master table, based on rowids recorded in said second master log and said second snapshot and based on the rowids of said second master table.

* * * * *